United States Patent [19]

Westwood

[11] 3,998,340
[45] Dec. 21, 1976

[54] CONVEYOR CROSS

[76] Inventor: Gordon L. Westwood, 968 N. 2nd East, Orem, Utah 84057

[22] Filed: May 12, 1975

[21] Appl. No.: 576,789

Related U.S. Application Data

[63] Continuation of Ser. No. 380,152, July 18, 1973, abandoned.

[52] U.S. Cl. .......................... 214/38 C; 193/35 R; 193/42
[51] Int. Cl.² ........................................ B65G 13/00
[58] Field of Search .......... 214/38 C, 38 D, 38 CC, 214/1 H, 16.1 CF, 730, 84, 1 D; 238/13; 248/119 R, 352, 430; 193/35 R, 42; 254/DIG. 1

[56] References Cited

UNITED STATES PATENTS

| 3,337,066 | 8/1967 | Reed et al. ...................... 214/38 C |
| 3,796,334 | 3/1974 | Torrey ............................... 214/1 H |
| 3,817,401 | 6/1974 | Becker .............................. 214/1 H |

Primary Examiner—Albert J. Makay
Attorney, Agent, or Firm—B. Deon Criddle

[57] ABSTRACT

The apparatus of the invention is primarily intended for use to closely align, in side-by-side relationship, one mobile home section with another, and consists of an arrangement of conveyor crosses, each comprising a pair of roller-type conveyor sections connected in back-to-back relationship such that their roller surfaces are oppositely facing. A pivotal connection between roller conveyor sections allows the backs of the roller conveyor sections to be moved over one another for storage and transport and to be pivoted apart into a cross with the legs thereof extending at right angles to one another. A plurality of conveyor crosses are installed on support tracks positioned beneath the mobile home section to provide support for that mobile home section at strategic points. Rollers of the lower roller conveyor sections are arranged to travel on the support tracks while the roller portions of the upper roller conveyor sections engage and support thereon longitudinal frame members of the mobile home section. Thereafter, the mobile home section can be moved in one direction of travel, with its frame members traveling over the roller portions of the upper roller conveyor sections. The mobile home section can also be moved transversely to the one direction of travel, with the roller portions of the lower roller conveyor sections traveling along the transverse tracks.

7 Claims, 5 Drawing Figures

FIG 3
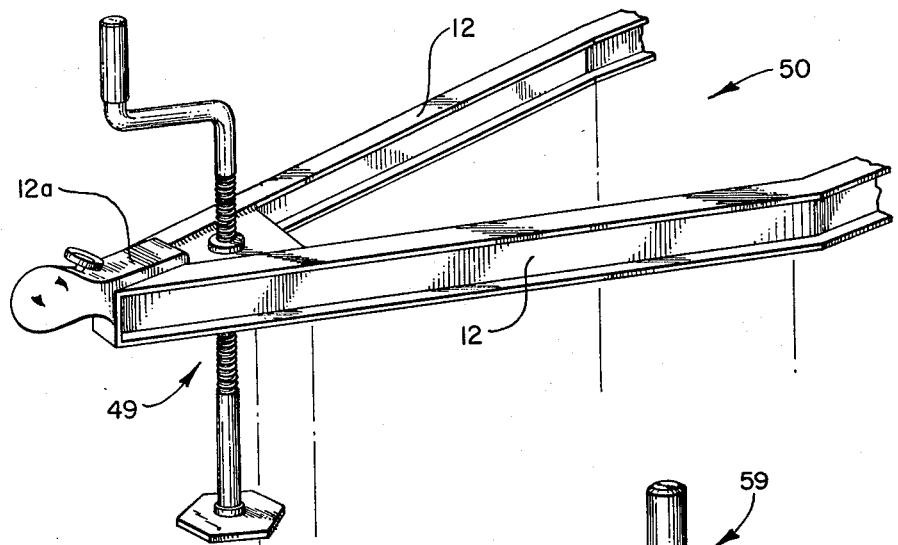
FIG 4
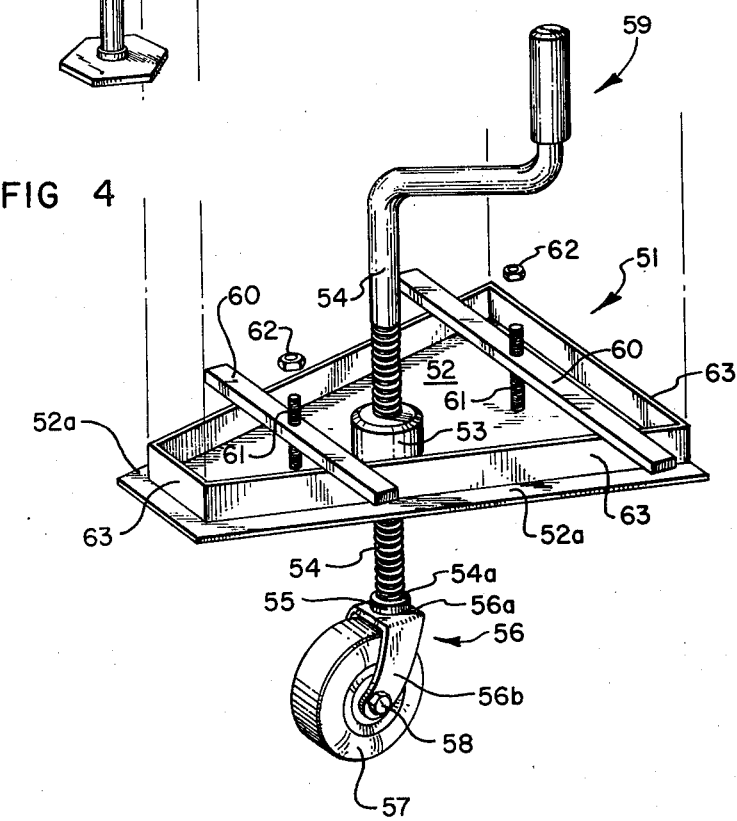
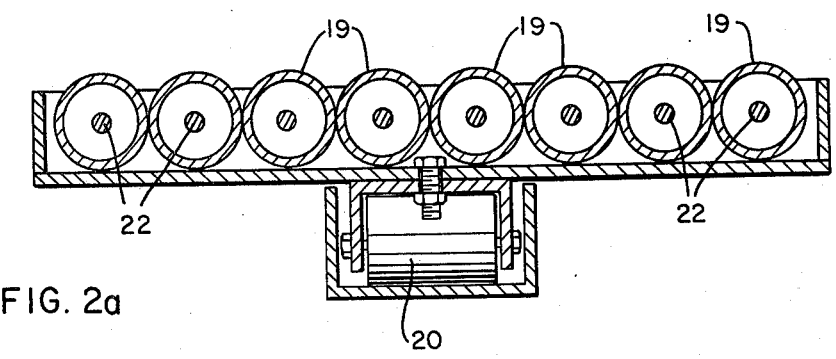
FIG. 2a

CONVEYOR CROSS

BRIEF DESCRIPTION OF THE INVENTION

This application is a continuation of my application, Ser. No. 380,152, filed July 18, 1973, now abandoned.

FIELD OF THE INVENTION

This invention relates to apparatus and methods for moving a large and heavy item, such as a mobile home section, short distances in transverse directions.

PRIOR ART

Intersecting roller systems for facilitating movement of freight and large heavy items such as a truck van body, have long been known and in common use. U.S. Pat. No's. 2,720,989, 2,892,554, 2,966,206, 3,243,062 and 3,279,631, while showing systems that are structurally and operationally unlike the present invention, do illustrate how intersecting roller systems have been adopted for such freight and heavy item handling in the past.

U.S. Pat. No's. 3,084,813 and 3,469,723 disclose applications of roller mechanisms for moving mobile homes and mobile home sections. U.S. Pat. No. 3,084,813 discloses an arrangement for moving a trailer into a stall in a high-rise trailer court and involves a trailer lifting arrangement and roller means for moving the elevated trailer in one direction. U.S. Pat. No. 3,469,723, discloses a modification to a mobile home section undercarriage involving the permanent mounting of a living quarters portion of a mobile home section to an intersecting roller arrangement that is incorporated into the mobile home section undercarriage. Such an arrangement, while it does provide for short distance transverse movement to the living quarters portion involves permanent installation of the mobile home section. Furthermore, since the living quarters portion is permanently attached to the undercarriage roller arrangement, transverse and longitudinal movements of the living quarters portion thereof must be very limited so that the center of gravity of that living quarters portion will not pass beyond the undercarriage, overbalancing the unit and causing it to tip over.

The present invention recognizes the inherent advantages of providing longitudinal and transverse movement capabilities to a mobile home section, but is concerned with situations wherein such movement is required only as a matter of moving one mobile home section into side-by-side coupling engagement with another such section. The moving apparatus need be attached to the mobile home section only when such movement is required. Thereafter, the apparatus should be readily detachable for use elsewhere.

The present invention, unlike the prior art devices or any device within my knowledge, involves a portable, readily installed and detached apparatus for use with a standard mobile home section to provide a means for supporting and moving such a mobile home section longitudinally and transversely.

SUMMARY OF THE INVENTION

It is a principal object of the present invention to provide a conveying means for temporary use in supporting an item to be moved, such that the supported item can be moved transversely into position to be coupled with a stationary item.

Another object is to provide a conveying means that is portable and can be arranged as a cross, with roller arrangements on opposite faces thereof, and with one such roller assembly riding on a support track arrangement and with the other roller assembly supporting a structural frame member of the item to be moved.

Another object is to provide a conveyor cross fabricated from inexpensive roller conveyor sections that can be pivoted with respect to one another.

Still another object is to provide means for temporarily elevating into and for maintaining a number of conveyor crosses of the invention on support track arrangements in supporting engagement with an item to be moved.

Still another object is to provide conveying means and support means therefor that can be easily and inexpensively produced and that are simple to install in support engagement with, and to remove from, an item to be moved.

Principal features of the present invention includes a conveyor cross formed from two roller conveyor sections, each constructed from a section of channel that has parallel, spaced flanges extending normal to one face of a straight and flat web. Rollers are journaled between the respective channel flanges. The backs of the sections are formed by two channel webs that are preferably pivotally joined into a conveyor cross. The described back-to-back connection is preferably made at the mid-points of the channel sections, so that as the respective conveyor sections are pivoted with respect to one another, the legs radiating from the pivot connection can be spread apart into a cross where the individual legs thereof are of equal length and are spaced apart at right angles to one another.

A plurality of such conveyor crosses of the invention are individually arranged on support tracks that are then positioned beneath a mobile home section. So arranged, the rollers of lower roller conveyor section of each conveyor cross travel along the support track. The rollers of the upper roller conveyor section, of course, face oppositely to the rollers of the lower roller conveyor section, and are intended to receive and support longitudinal frame members of the mobile home section. When the support track is elevated and maintained such that the rollers of each upper roller conveyor section lifts the mobile home section off of the ground, the mobile home section can thereafter be moved longitudinally with the longitudinal frame members thereof traveling on the rollers of the upper conveyor section and can be moved transversely with the roller of the lower conveyor section traveling along the support track.

Elevation of the support tracks and conveyor crosses thereon can be accomplished by appropriately operating a tongue jack of the mobile home section whose movement into side-by-side coupling engagement with a fixed mobile home section is desired. Jack means can be used, in well known fashion, to elevate the rear end of the mobile home section and support stands can then be placed under the elevated support tracks. The mobile home section, resting as described on the rollers of the upper roller convey sections of each of the conveyor crosses, can than be moved as described, and thereafter be permanently supported by positioning blocks or the like therebeneath. The support tracks and the conveyor crosses can be then lowered to out of engagement with the trailer section, and can be used in moving another such mobile home section.

As an alternative to providing support tracks beneath both ends of an item to be moved, the present invention may also include a platform for attachment to the tongue of a mobile home section. The platform has a vertical, worm gear threaded shaft pivotally extending therethrough and having a dolly wheel thereon capable of pivoting a full 360° about the vertical shaft axis. In installing the platform in supporting engagement at the front of a mobile home section, that mobile home section is supported on its jack, the landing gear positioned and the dolly wheel is lowered until it engages the ground. Thereafter, the jack is operated to place the weight of the nose end of the mobile home section resting on the landing gear wheel and off the jack. The rear end of the mobile home section can then be elevated by jacks and will then be supported as previously described by support tracks and conveyor crosses.

Additional objects and features of the invention will become apparent from the following detailed description, taken together with the accompanying drawings.

THE DRAWINGS

FIG. 1 is a perspective view, taken from a front corner of a first mobile home section (shown in phantom) arranged on conveyor crosses of the present invention for movement into position against a second mobile home section (shown in phantom);

FIG. 2, a perspective view of a single conveyor cross and a section of support track of FIG. 1 supported on adjustable support stands;

FIG. 2a, a vertical section, taken on the line 2a—2a of FIG. 2;

FIG. 3, an enlarged, fragmentary, perspective view of the usual tongue of a mobile home section, including a jacking leg with fixed base; and FIG. 4, a perspective view showing a removable dolly wheel and platform of the present invention adapted to be affixed in place on a mobile home section tongue.

DETAILED DESCRIPTION

Figure 1:
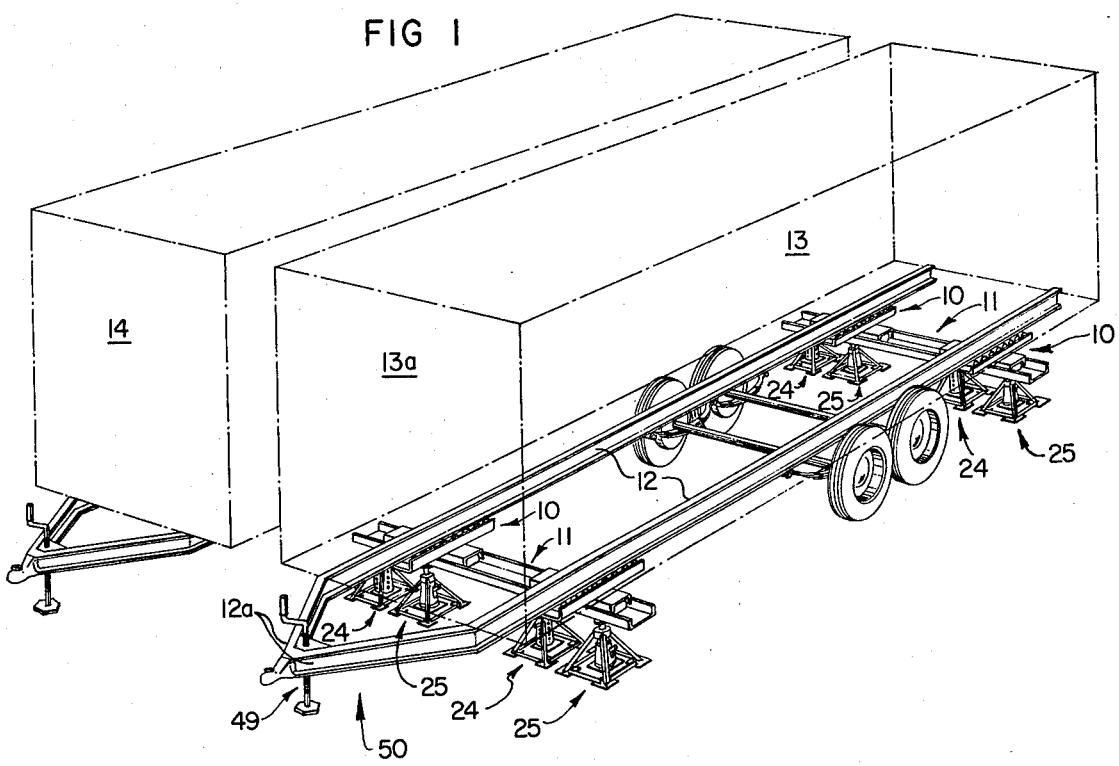

Referring now to the drawings:

As shown in FIG. 1, four conveyor crosses 10 of the present invention, are arranged as pairs on support tracks 11 and 11a. The individual conveyor crosses are strategically positioned beneath longitudinal frame members 12 of a mobile home section shown in phantom at 13. The mobile home section 13 is shown supported at approximately its corners, and such corner support has been found preferable in many instances. Arranged as shown, the mobile home section 13 can be moved in one direction and transverse thereto to exactly align the mobile home section 13 in a side-by-side, coupling relationship with a standing mobile home section 14, which is also shown in phantom in FIG. 1.

Figure 2:
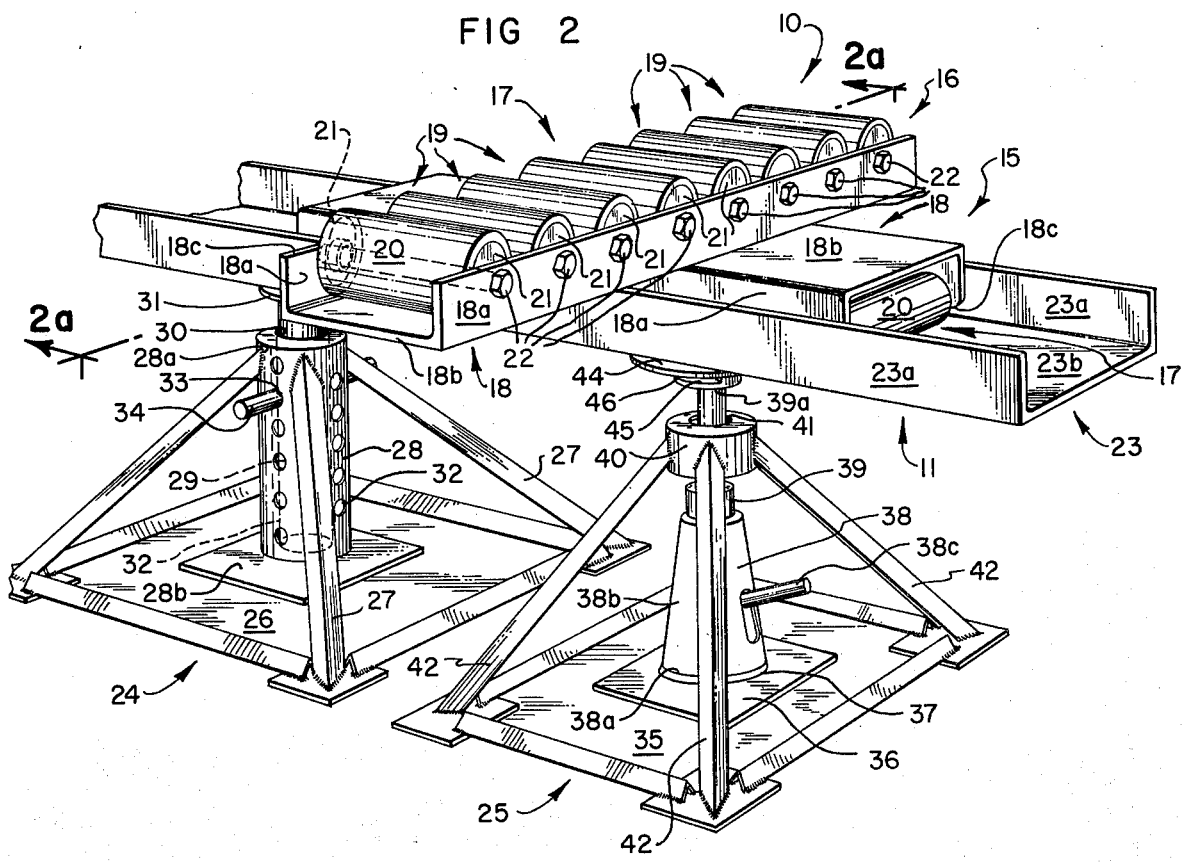

An individual conveyor cross 10 is shown in FIG. 2, resting on a section of support rack 11 that is maintained on adjustable stands 24 and 25, respectively. The conveyor cross consists of lower and upper roller-type conveyor sections 15 and 16, respectively connected in back-to-back relationship at approximately their mid-points. The roller conveyor sections can be assembled to extend across one another and to form a cross having radiating legs of about equal length, each extending at right angles to each other adjacent leg and with the lower roller conveyor section arranged on the support track 11. Roller assemblies 17, shown in FIG. 2, are arranged as part of both the roller conveyor sections 15 and 16, facing oppositely to one another.

The individual roller conveyor sections 15 and 16 illustrated are of identical construction. Thus, explanation of one should be taken as an explanation of the other also. Roller conveyor sections 15 or 16 are each preferably fabricated from a section of channel 18 having parallel upstanding flange 18a that extend outwardly and in the same direction from along the opposite edges of a straight channel web 18b. A plurality of identical rollers 19 are journaled between the flanges 18a, on line with one another, and spaced apart at equal intervals, to comprise a roller assembly 17. Each roller 19 extends across the straight web 18b and an equal arcuate portion of its cylindrical surface extended beyond the projecting edges 18c of the flanges 18a, to form a roller surface for engaging either the support track 11 or a longitudinal frame member.

Each roller 19 is preferably fabricated from a length of pipe 20 having roller bearings 21, shown in dotted lines in FIG. 2, installed in the respective pipe ends. Bearings made by the Nice Company of Philadelphia, Pa., Manufacturer's part No. 5273, have been found in practice to work satisfactorily as bearings 21. Axles 22, shown as bolts in FIG. 2, are installed through appropriate opposite holes formed through both the channel flanges 18a and through bearings 21 to secure the rollers 19 thereto.

While the conveyor cross 10 may be formed by rigidly securing the mid-points of the roller channel sections together into a cross, it is preferred that the mid-points the backs of the roller conveyor sections 15 and 16 be pivotally connected, as by a bolt and nut assembly P, FIG. 2a. So connected, the back of one channel web 18b is in contact with and will travel over the other, such that the roller conveyor sections 15 and 16 can be pivoted into aligned relationship for storage and transport, and can be spread apart into a cross for use as herein described.

Assuming that the roller conveyor sections 15 and 16 are pivoted into a cross, the rollers 19 of the lower roller conveyor section 15 can be arranged to roll along the top surface of the support track 11. To insure continuing positioning of the rollers 19 thereon, the support track 11 is preferably fabricated with side walls that will hold the lower roller conveyor section in place. Support track 11 is preferably formed from a section of channel 23 having parallel upstanding flanges 23a that extend in the same direction from along opposite edges of a flat web member 23b. The width of the flat web member 23b between the flanges 23a is fabricated to be slightly greater than is the width of the lower roller conveyor section 15 so that the lower roller conveyor section can travel freely therealong. The flanges 23a act as side walls for maintaining the rollers 19 on the web member. While a section of channel is the preferred form of the support track 11, it should be understood that other structural members such as an I-beam, a flat plate, a wood beam or any other like structure having a rigid flat surface over which the rollers 19 can travel, could be arranged as the support track 11 without departing from the subject matter coming within the scope of this invention.

As shown in FIG. 1, the support tracks 11 may be positioned across the respective front and rear ends of the mobile home section 13 when in use.

As shown, the support tracks have been positioned on adjustable jack stands 24 and 25 and have been raised to support the mobile home section 13. The rollers 19 of the upper roller conveyor sections 16 of each conveyor cross 10 engage a longitudinal frame member 12 of the mobile home section 13 undercarriage, and the rollers 19 of the lower roller conveyor section 15 rest on the web 23b of the support track. The mobile home section frame members 12 are shown to be essentially parallel to one another with the support tracks 11 positioned below and at right angles thereto such that the upper roller conveyor sections 16 are parallel or in the same plane with the respective frame member 12. By appropriately positioning the upper roller conveyor sections of the conveyor crosses 10 on the support tracks 11 during elevation thereof, the rollers 19 of the upper roller conveyor sections 16 will engage the undersurfaces of the respective frame members 12, the frame members thereafter elevating those support members and the mobile home section 13 off of the ground, such that the frame members are free to roll thereon.

The mobile home section 13 with its frame members 12 supported as described above, can thereafter be moved in one direction by rolling the frame members over the upper roller conveyor section rollers 19, and transversely by traveling the lower roller conveyor section rollers 19 along the support tracks.

In FIG. 3, there is shown a tongue 50 from a mobile home section 13 and in FIG. 4, there is shown a removable dolly wheel and platform assembly 51 affixed thereto that is adapted to be fixed to the tongue 50. The wheel and platform assembly 51, FIG. 4, preferably consists of a flat, rigid plate 52, dimensioned to extend beyond the tongue members so that the longitudinal frame members 12 will be supported thereon. An upstanding threaded collar 53 is centrally fixed to plate 52 and a rod 54 is threaded therethrough and has a wheel support frame 56 swivelled thereto at 55. The wheel support frame 56 is formed as a U-shaped fork having identical legs 56b extending from a web 56a.

An axle 58 extends between the legs 56b, and a wheel 57 is journaled on the axle. A crank 59 is formed on the rod 54 at the end opposite to wheel 57 and the crank end 54a is turned to raise or lower the wheel 57 into and out of engagement with the ground below the mobile home section 13.

With the tongue 50 supported on edges 52a of the plate 52 the weight of the nose end of the mobile home section is transmitted by ground through the threaded rod 54 and the wheel 57. The dolly wheel and plate assembly is preferably secured to the tongue 50 by installing bars 60 over posts 61 that extend upwardly from the plate 52, such that the longitudinal frame members 12 are sandwiched between the ends of bars 60 and the plate edges 52a. Nuts 62, threaded onto posts 61, secure the bars 60 in place. In operation, with the nose of the mobile home section supported on the jack stand 25 or on a nose jack 49 of the mobile home section, the plate 52 is secured below the mobile home section tongue 50 as has been described. Crank 59 is operated to move the wheel 57 downwardly until it engages the ground and takes the load of the tongue. Thereafter, the jack stand 25 or nose jack 49 can be retracted.

The dolly wheel and platform assembly 51, secured as described to the tongue 50, is intended as an alternative support arrangement for the front end 13a of mobile home section 13 during positioning of the section against section 14. Assuming the mobile home section is supported at a desired elevation by the assembly 51, the opposite or rear end of the mobile home section 13 is then elevated and supported in the manner previously described, on a plurality of conveyor crosses 10 installed on support track 11 arranged across and beneath the mobile home section undercarriage. The mobile home section 13 can thereafter be moved in one direction, as for example, with the longitudinal frame member 12 traveling along the rollers 19 of the upper roller conveyor sections 16 and with the wheel 57 rolling along the ground, or over a flat plate, or the like, not shown. Thereafter, the dolly wheel will swivel so that the nose of the mobile home section supported on the wheel will follow as the section 13 is moved transversely, with the rollers 19 of the lower roller conveyor section then traveling along the support track 11.

While the described rollers 19, journaled between upstanding flanges 18a of sections of channel, are a preferred construction of the roller arrangements 17, it should be understood that other configurations of roller arrangements, with or without cylindrical rollers, could be used in the present invention. Other roller arrangements, for example, could involve pluralities of balls turning in seats arranged in horizontal planes, that intersect in a cross, or pluralities of bearings journaled to turn between parallel and aligned flanges that intersect in a cross, or a similar configuration involving roller means turning in planes that intersect in a cross, which variations would not depart from the scope of this invention.

In FIG. 1, there is shown preferred arrangements of adjustable jack stands 24 and 25 engaging the bottom ends of the support tracks. Each of the stands 24 and 25, as shown best in FIG. 2, is fabricated as a pyramid with sides that taper inwardly to meet at an apex directly above the center of a base. While FIGS. 1 and 2 show both of the adjustable jack stands arranged at each support track end, it should be obvious, that only one such stand may actually be required to support each support track end.

As shown best in FIG. 2, the adjustable stand 24 consists of a flat stand base 26 that is preferably formed as a thin square. From the corners of the stand base 26, side support members 27 extend upwardly, tilting inwardly towards one another to form the pyramid sides. The side support members 27 terminate at spaced intervals around a top end 28a of an upstanding support cylinder 28. The upstanding support cylinder 28 is in turn secured at its base end 28b to the center of the stand base 26 extending in a right angle upwardly therefrom. A second or inner cylinder 29, shown in dotted lines in FIG. 2, is telescoped within the support cylinder 28, the top end 29a thereof projects upwardly through an opening 30 formed through the support cylinder top 28a. A platform 31 is secured across the top 29a of the inner cylinder. A number of aligned pairs of holes 32, shown also in dotted lines in FIG. 2, are formed through the wall of the inner cylinder 29, spaced apart from one another in ascending longitudinal lines on opposite sides of the inner cylinder. One of the pairs of holes 32 is intended to receive a pin 34 fitted therethrough and through two opposite holes 33 formed across from one another in the support cylinder 28. So arranged, the pin 34 can secure together as a rigid column the support and inner cylinders 28 and 29.

The jack stand 25, like adjustable stand 24, is preferably shaped as a pyramid and has a flat base 35 whereon a jack support platform 36 is centered. The jack support platform 36 has a central recess 37 formed therein to receive the base 38a of a standard hydraulic jack 38. A telescoping mast 39 is extended out from the top 38b of the jack 38 as by pumping jack handle 38c, building up a hydraulic pressure therein. Side support members 42, like the side support members described with respect to the adjustable stand, extend upwardly from the corners of the stand flat base 35, slanting inwardly forming the pyramid sides. The side support member 42 terminate at spaced intervals around a circular collar, through a hole 41 in which circular collar 40 and the telescoping mast 39 is intended to travel.

With the base 38a of a standard hydraulic jack 38 installed in the jack stand central recess 37 appropriate up and down movement of the jack handle 38c will build up hydraulic pressure within the jack that extends the mast 39. The telescoping mast 39 passes through the hole 41 in collar 40. Thereafter, a lock collar 45 of a platform 44 can be positioned across and over the mast top 39a. A pin 46 is installed through appropriate aligned openings in the collar 45 and mast top 39a to secure the platform 44 to the mast top. Then, by again moving appropriately the jack handle 38c the mast 39 is further extended elevating the platform 44 into engagement with and thereafter lifting the undersurface of the channel web 23b of the support track 11.

In practice, to align the mobile home section 13 with a standing mobile home section 14, the mobile home section is first moved alongside and in proximity to the standing mobile home section as by a towing vehicle, not shown. Thereafter, the nose jack 49 is turned into ground engagement and the towing vehicle is removed. The nose jack 49 is generally a standard item of equipment on such a mobile home section and extends downwardly from the junction 12a of the longitudinal frame members 12 that form the tongue 50.

As has been heretofore described, an item to be moved longitudinally and transversely, such as the mobile home section 13, can be supported proximate to the corners on conveyor crosses 10 arranged on support tracks 11. Alternatively, the front or nose end 13a of the mobile home section can be supported on the described wheel and plate assembly 51, with the rear or back end thereof maintained on conveyor crosses 10. Either arrangement will provide for the lifting of the mobile home section 13 up off of its wheels to allow for short distance longitudinal and transverse movement thereof. The mobile home section front or nose end 13a can be elevated, by use of the nose jack 49. Thereafter, the wheel and platform assembly 51 or support track 11 with conveyor crosses 10 thereon, supported by adjustable stands 24, or like columnar supports can be arranged thereunder and the nose end 13a of the mobile home section can be lowered thereon. Of course, a pair of jack stands 25 arranged at the corners of the mobile home section nose end could be used in place of the nose jack 49 to appropriately elevate the mobile home section. With the platform 31 of the adjustable stands 24 elevated to appropriately support tracks 11 and the jack 49 or jack stands 25 can thereafter be lowered such that the weight of mobile home section comes to rest on the stands 24. Thereafter, jack stands 25 can be removed for other use from beneath the support track 11. Lowering the mobile home section 13 back onto its wheels or onto blocks requires re-elevating the mobile home section off the adjustable stands removing those stands, and then lowering the unit onto its wheels or blocks.

Although a preferred form of my invention has been herein disclosed, it is to be understood that the present disclosure is made by way of example and that variations are possible without departing from the subject matter coming within the scope of the following claims, which subject matter I regard as my invention.

I claim:
1. Apparatus to provide simultaneous transverse and longitudinal movement capabilities to a structure supported thereon comprising
   a portable support track adapted to be removably positioned below a structure to be moved;
   a portable conveyor cross having first and second conveyor sections connected across one another at normal angles, said first section being removably mounted on said support track and said second section being adapted to receive the structure to be moved;
   roller means carried by said conveyor cross first section and engaging said support track to provide rolling support to said conveyor cross traveling over said support track;
   roller means associated with said conveyor cross second section to receive a portion of said structure to be moved thereon whereby the structure can be moved over the rollers with respect to the conveyor cross; and
   portable support means arranged below said support track as a support between the ground and said support track undersurface, said support means including means for adjusting the vertical level of said support track and the conveyor cross carried thereby and for moving into and out of engagement with said support track.

2. Apparatus as recited in claim 1, wherein
   a pair of support tracks are arranged below the structure to be moved, near opposite ends thereof, each support track having a plurality of conveyor crosses thereon in supporting engagement with and supporting said structure to be moved thereon.

3. Apparatus as recited in claim 2, wherein
   the support tracks are arranged parallel to one another and extend across the opposite ends of the structure to be moved, with longitudinal frame members of said structure to be moved positioned on the roller means associated with each conveyor cross second section.

4. Apparatus to provide simultaneous transverse and longitudinal movement capabilities to a structure supported thereon comprising
   a portable support track adapted to be removably positioned below a structure to be moved;
   a portable conveyor cross having first and second conveyor sections pivotally connected whereby, said first and second sections are pivotable into aligned relationship for storage and transport and into intersecting relationship to form a cross, said first section being removably mounted on said support track and said second section being adapted to receive the structure to be moved;
   roller means carried by said conveyor cross first section and engaging said support track to provide rolling support to said conveyor cross traveling over said support track;
   roller means associated with said conveyor cross second section to receive a portion of said structure to be moved thereon; and portable support means arranged below said support track as a support between the ground and said support track undersurface, said support means including means for adjusting the vertical level of said support track and the conveyor cross carried thereby and for moving into and out of engagement with said support track.

5. Apparatus as recited in claim 4, wherein the roller means comprises
- a plurality of equal length sections of pipe fitted between flanges of channel members making up the conveyor sections;
- bearing means arranged in each end of each said section of pipe supporting on outer races thereof the ends of said section of pipe;
- axle means extending between said flanges and through said pipe sections; and
- bearing means between each said pipe sections and said conveyor sections.

6. Apparatus as recited in claim 1, wherein the support means consists of
- adjustable stand means for providing a height adjustable columnar support on which the undersurface of said support track is positioned.

7. Apparatus as recited in claim 6, wherein the adjustable stand means includes
- a jack having a body portion and an extending portion; and
- a pyramid shaped stand fixed to and projecting outwardly from the body portion to a base.

* * * * *